Jan. 26, 1965  W. R. HAWTHORNE ETAL  3,167,103
FLEXIBLE CONTAINERS
Filed Jan. 13, 1960  7 Sheets-Sheet 1
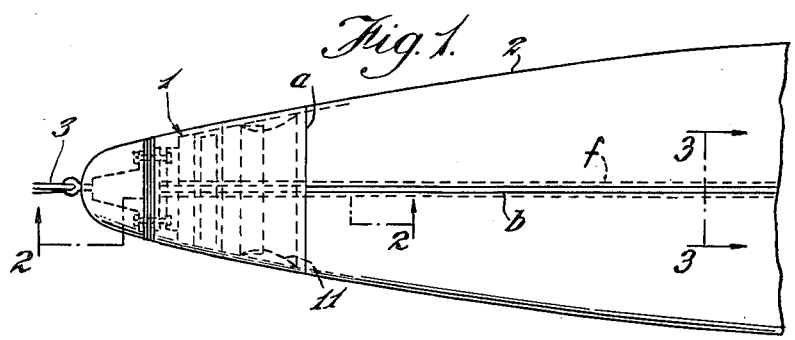
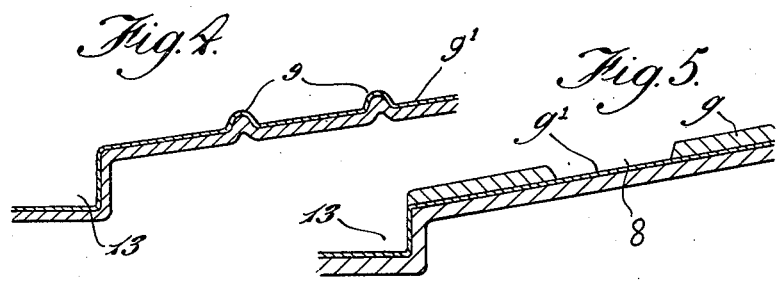
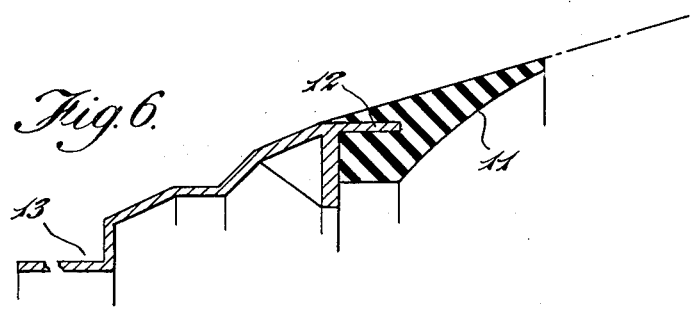

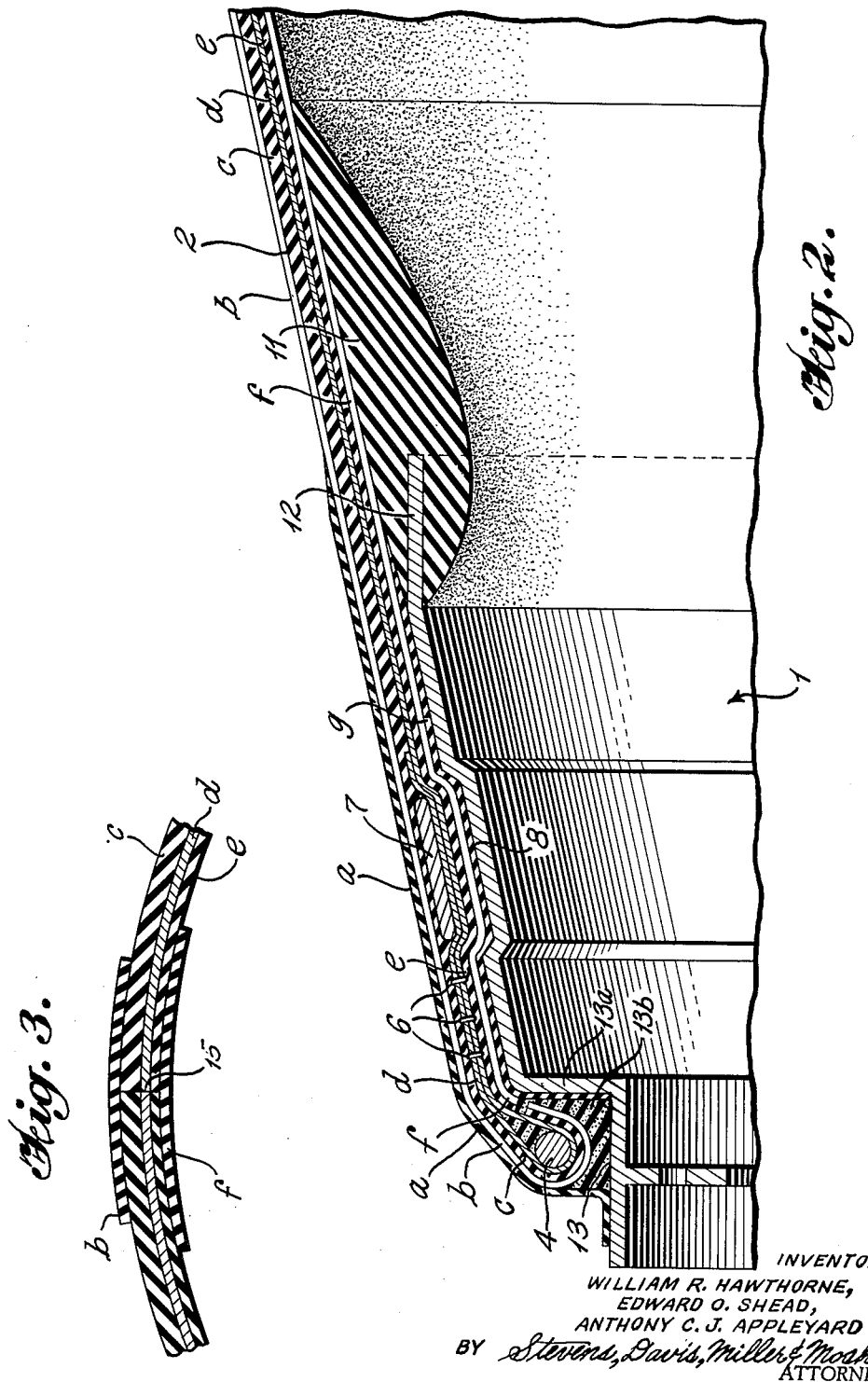

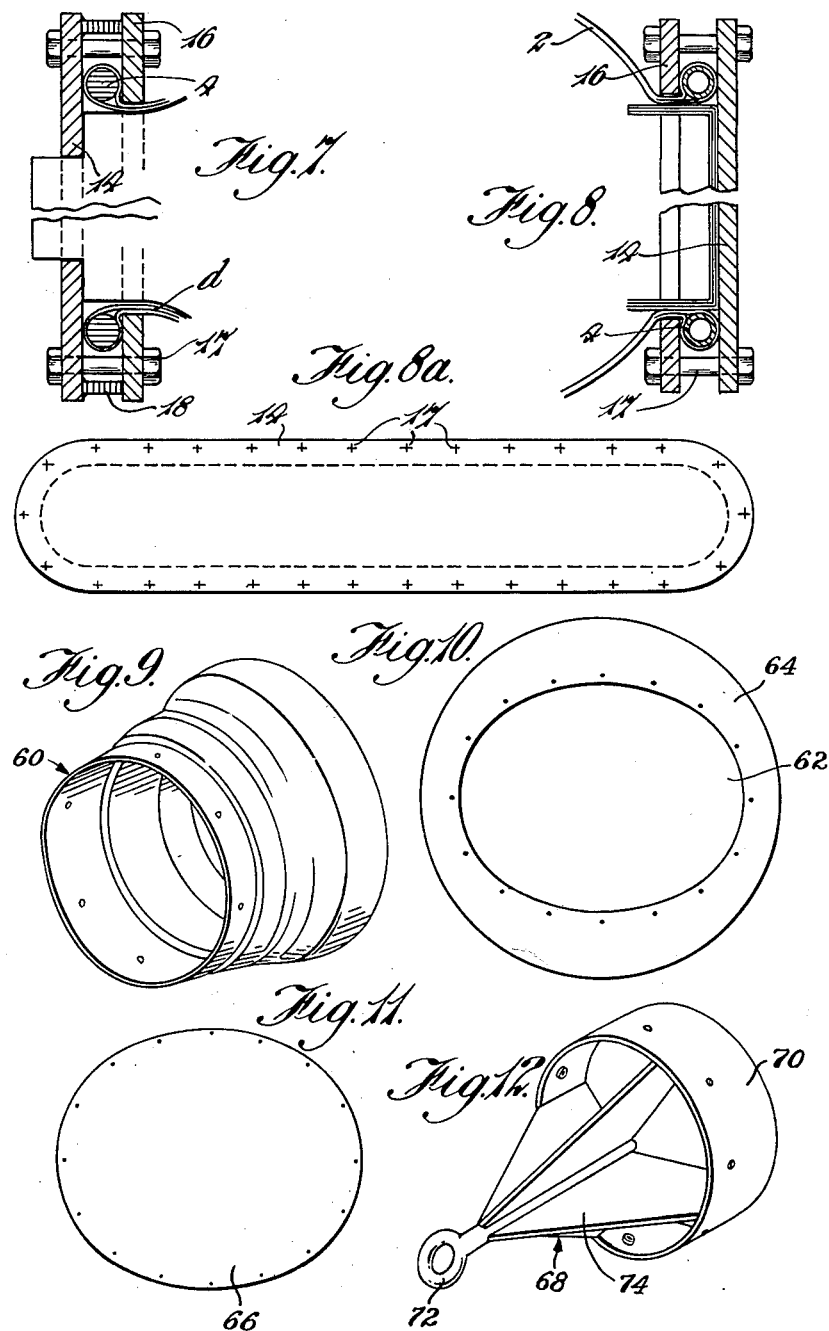

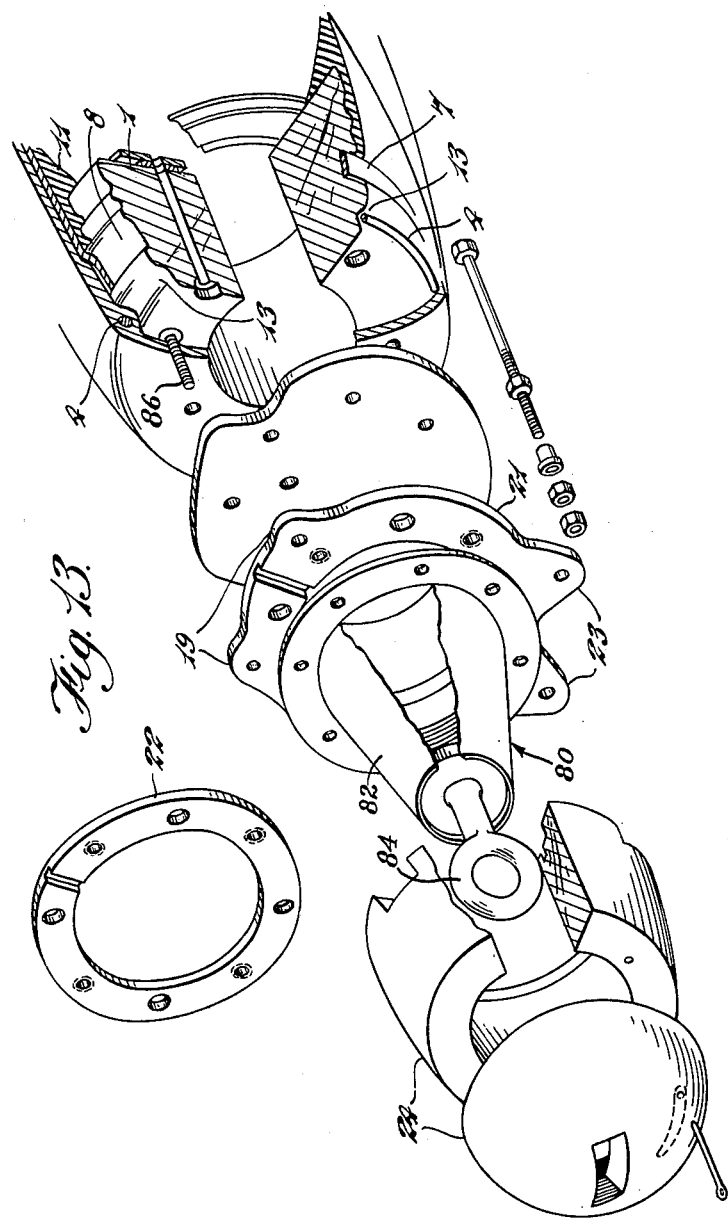

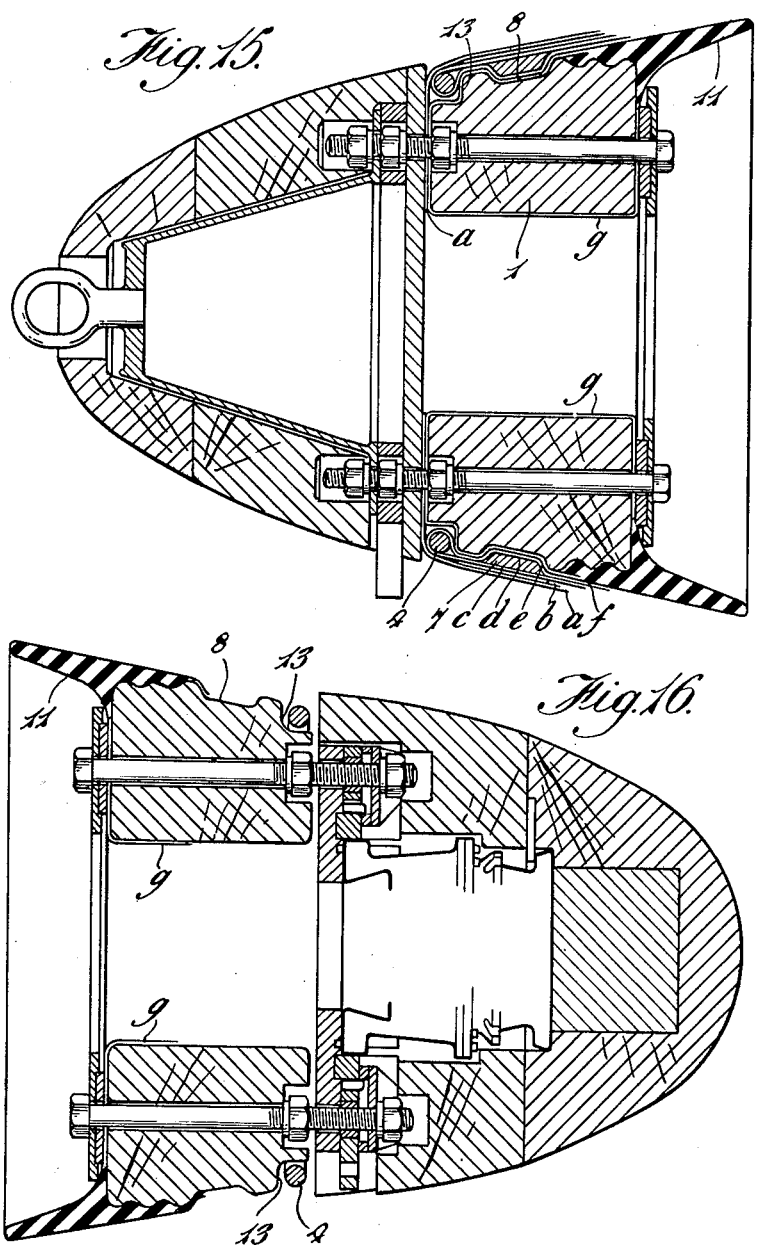

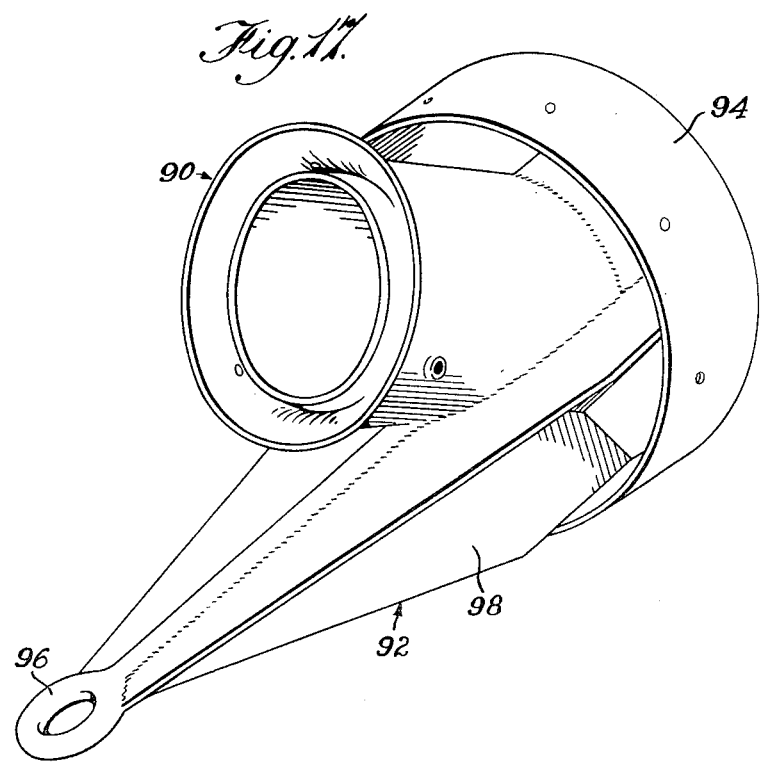
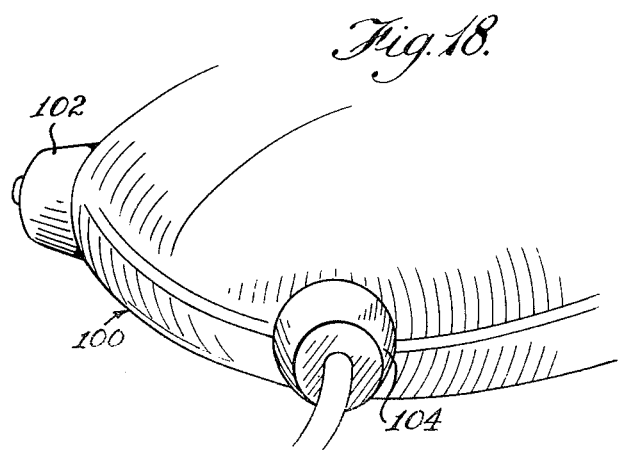

3,167,103
FLEXIBLE CONTAINERS

William Rede Hawthorne, Cambridge, Edward Olaf Shead, London, and Anthony Cyril John Appleyard, Ely, Cambridgeshire, England, assignors to Dracone Developments Limited, London, England
Filed Jan. 13, 1960, Ser. No. 2,175
Claims priority, application Great Britain, Jan. 19, 1959, 1,922/59
14 Claims. (Cl. 150—.5)

The invention relates to flexible vessels such as barges and storage containers, particularly collapsible vessels intended primarily for the transport and/or storage of fluids and pourable solids. The present invention aims at improving the method of manufacture of the vessel.

According to the invention, a flexible envelope for the vessel is attached to a retaining ring which is adapted to be secured to a rigid end piece for the vessel, said end piece being provided with an annular shoulder against which the ring bears when the envelope is taut. The envelope may be attached to the ring by having its strength-giving layer turned over the ring and then sewn to itself. The shoulder may be formed by a recessed emplacement for the ring provided in the end piece or by one of two annular plates for which a seating is provided on the end-piece and between which the ring can be clamped.

Additional means for securing the envelope to the end-piece may take the form of at least one clamping ring between which and the end-piece the envelope can be clamped and also preferably forced into a peripheral channel provided in or on the end piece. In so doing, it is preferred that the portion of the envelope that is turned over the retaining ring be also clamped and forced into the channel.

Various other aspects of the invention will become evident from the following description and the accompanying diagrammatic drawings, which are given by way of example, and in which:

FIG. 1 is a fragmentary diagrammatic side elevation of the bow portion of a flexible barge;

FIG. 2 is a fragmentary sectional view taken along line 2—2 of FIG. 1;

FIG. 3 is a partial sectional view taken along line 3—3 of FIG. 2;

FIGS. 4, 5 and 6 illustrate modifications of the rigid end-piece;

FIGS. 7 and 8 are sectional details of two modified means for mounting the retaining ring on respective rigid end-pieces;

FIG. 8a is an end view of the end-piece of FIG. 8;

FIGS. 9, 10 and 11 show a metallic end-piece in perspective and end views and a manhole cover therefor, respectively;

FIG. 12 is a perspective view of a towing attachment;

FIGS. 13 and 14 are exploded perspective views of the bow and stern portions respectively of a modified barge;

FIGS. 15 and 16 are sectional elevations corresponding to FIGS. 13 and 14, respectively;

FIG. 17 is a perspective view of a combined towing and loading attachment, and

FIG. 18 is a perspective view of a flexible stern portion for a barge attached to two rigid end-pieces.

Figure 14:
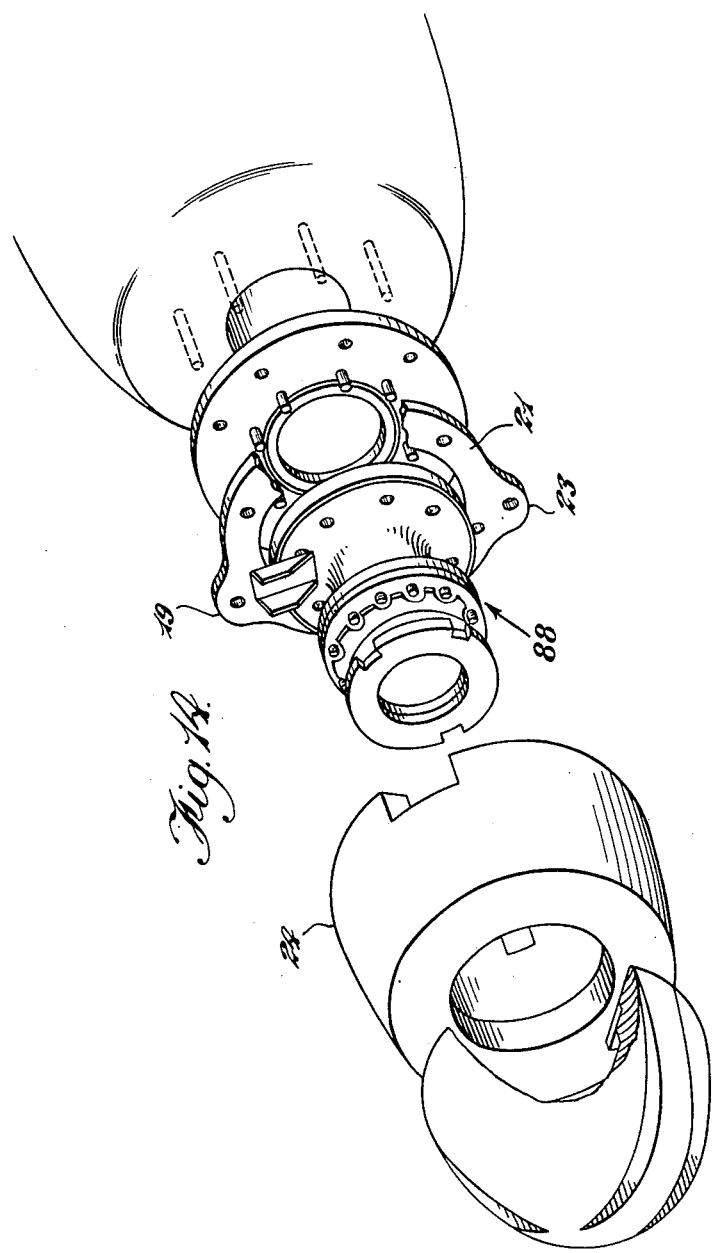

FIG. 1 shows the location of a rigid piece 1 at the bow or towing end of a tubular barge made from a flexible envelope 2. The connection between this rigid piece and the envelope must be such that it will withstand the internal pressure which may be in the order of 20 to 30 lbs. per square inch and the pull of an external tow rope 3, mooring rope or the like. Such pull will normally be between four times the maximum steady resistance to motion of a sea-going barge through the water and 20% of the weight of the barge and its cargo. The pull would be lower for barges in calm water and for storage vessels.

The envelope is attached to a retaining ring 4 (FIGS. 2, 7, 8, 13, 15, 16) by turning at least that layer $d$ (FIG. 2) of the envelope which supplies mechanical strength—for example nylon cloth or nylon yarn made into cord—round the ring 4 and back on itself. The envelope is prevented from slipping off the ring by stitching the turned-over portion to itself as at 6. The retaining ring 4 can be metal, plastics or rope suitably protected, and may be of a diameter smaller than the diameter of the rigid end-piece to prevent it slipping off the end-piece. When the envelope is taut, the retaining ring 4 bears or presses against an annular shoulder 13a provided in or on the rigid end-piece. In the case of FIGS. 2, 13, 15 and 16 such shoulder is formed by a recessed emplacement 13 for the ring. Additional means for securing the envelope to the end piece may take the form of at least one clamping ring 7 of metal, plastic or rope, also suitably protected. The ring 7 ensures a good cargo or water-seal between the fabric of the barge and the respective end-piece and is arranged to fit into or overlie a channel in or on the end-piece, such as the recess 8 (FIGS. 2, 13, 15 and 16) or the channel formed between two beads or ribs 9 (FIG. 4) preferably pressed out from the material of the end-piece. In FIG. 5, a resilient covering $g$ is built up on the end-piece so as to leave a gap to provide the recess 8 for the clamping ring 7.

The fabric used in the construction of the barge envelope is proofed with artificial rubber, plastics or the like with an outer proofing layer $c$ and inner proofing layer $e$ and may be constructed with seams 15 (FIG. 3) running longitudinally of the barge. The inner or cargo proofing layer $e$ extends under the clamping ring 7 almost up to the retaining ring, as shown in FIG. 2, and any seals or straps $f$ for sealing the seams 15 are also carried under the clamping ring 7 and nearly to the retaining ring. The external proofing layer $c$ of the fabric is carried over the clamping and retaining rings and further proofing or plastics or rubber straps $b$ or jackets $a$ may be applied externally to the construction as shown, also past the retaining ring. Strap $b$ is an external sealing strap sealing the longitudinal seam 15 (see FIGS. 1, 2 and 3). Seam 15 cannot be seen in FIG. 1, but it is to be understood, the seam 15 is disposed between the sealing straps $b$ and $f$. It is, however, possible to turn the proofed fabric round the retaining ring 4, stitch it through its proofing and then clamp it as described.

The end-pieces are preferably made of metal but can be of wood (FIGS. 13, 15 and 16) or plastics (fibreglass) and is preferably rubberised as at $g$ in FIGS. 3, 5 and 15 before construction of the joint of the envelope connection is commenced. Tubular metal end-pieces may be made by spinning, forging, pressing or fabricating and welding and are preferably suitably protected against corrosion. They may also be plated with brass $g'$ (FIGS. 4 and 5) to facilitate adhesion of the resilient covering $g$.

At the inner end of the end-piece a rubber or other resilient peripheral fairing 11 (FIGS. 1, 6, 13, 15 and 16) is attached to the end-piece by methods known to those familiar with the art. This fairing projects along the inner skin of the fabric and gradually tapers so as to ease working of the fabric at the point where it first comes into contact with the end-piece. FIG. 6 illustrates a steel ring 12 welded to the fabricated end-piece to make attachment of the rubber fairing more secure.

During the entire construction cement is applied to the fabric and to the rubberised end-piece 1 to ensure a good seal and contact between adjoining parts.

To prevent damage to the fabric by impact which could force it against the metal or wooden end-piece, a layer or layers 13a of sponge rubber may be wrapped around the construction under the external jacket a.

Alternative means for mounting the retaining ring 4 are shown in FIGS. 7, 8 and 8a, where two steel plates 14, 16 are arranged to clamp the retaining ring 4 between them, the plate 16 forming the shoulder against which the ring bears when the envelope is taut. The plates are held together wtih bolts 17 and distance pieces 18 are placed at the periphery. The plates are rubberised to ensure sealing between the ring 4 and the plates 14, 16 and to prevent damage to the fabric. The inner plate 16 is clear of the fabric which passes through it and the outer plate 14 is rigidly attached to the end-piece by further bolts or by welding. An adaptation of this attachment to a barge which is formed at its end into a flattened, elliptical section, is represented by FIGS. 8, 8a, The end-pieces which are preferably of circular-section or may be of flattened elliptical section, are tapered or conical to give a wedge action on the fabric retaining ring. Their smallest diameter is such as to provide internal access to the barge.

FIGS. 9 and 10 show a fabricated tubular metal end-piece generally indicated as 60 in which the hole 62 at one end is oval and of the size required to give access to a man but it is preferred to make the end-piece 60 of circular section throughout its length. It is to be understood that plate 64 is attached at the respective end of tubular end-piece and connected thereto by any conventional means (not shown). The inner end may be sealed by a plate or manhole cover, 66 (FIG. 11). The towing attachment may be of a fin construction 68 as shown in FIG. 12. Said fin construction 68 has a cylindrical base 70 and a towing nose member 72 and a plurality of structural fins 74 connected therebetween. The base 70 of the towing attachment is held to the end-piece by a number of bolts (not shown).

FIGS. 13 to 16 illustrate wooden end-pieces 60 in more detail. The towing attachment 80 is a conical shell 82 with an eye 84 at its narrow end (FIGS. 13 and 15). Longitudinal bolts 86 extend through the wooden end-piece and provide means for attaching the towing shell 80 or a hose pipe or coupling 88 for fluid cargo (FIGS. 14 and 16). Lifting lugs may be attached to the end-piece or may be formed at 19 in plates 21 held by the bolts to the end-piece (FIGS. 13 and 14). In FIG. 13, the ring 22 is an alternative to a lifting ring. Attachments 23 for hydrofoils may also be provided. The towing and fuel connection assemblies are covered with fairings 24 made of plastics or wood and lined with buoyant plastics or buoyancy chambers. Fluid cargo connections 90 to the barge may be combined with towing attachments 92 as shown in FIG. 17. A spring-loaded or hand-operated valve and gear (not shown) may be incorporated in the fluid connections. For some applications, the use of an angled connection as shown in FIG. 17 will be preferred. Again, the towing arrangement 92 as shown in FIG. 17 has a cylindrical base section 94 which is adapted to be mounted on a respective end-piece. A towing eye 96 is connected to base section 94 by the plurality of structural flanges 98 while the fluid cargo connection 90 is angularly mounted and adapted to communicate through the respective end-piece to the inside of the barge (not shown in this figure).

Another form of fluid connection is a long flexible pipe which is attached to the end piece at one or more points and which trails the barge. The trailing end of such a pipe may be sealed with a blank flange or may be fitted with a quick-acting fluid connection.

In some applications a pipe designed to be retractable within the barge will be preferred. Electrical bonding of any metal parts used in the construction of the end-piece will be incorporated for barges carrying inflammable or explosive cargoes. A terminal to which earthing wires can be attached is provided.

In a modification (FIG. 18), the flexible envelope 100 is provided with two faired corner portions 102 and 104 (FIG. 18). One of these corner portions 102 is fitted with a manhole, whilst the other (104) is fitted with filling, emptying and gauge connections and both constitute rigid end-pieces such as the type shown in FIG. 2 attached to the flexible envelope in a manner as described earlier.

Although the above description refers to barges by way of example, it is to be understood that the invention extends to and can be applied to land-based storage vessels and transportable containers.

We claim:
1. A flexible vessel comprising a flexible envelope and a rigid end piece, said envelope comprising a strength giving layer, an outer proofing layer and an inner proofing layer, a retaining ring mounted on said end piece, said strength giving layer being attached to said retaining ring by being turned over the retaining ring and stitched to itself, said end piece having an annular shoulder against which the retaining ring bears when the envelope is taut, at least one clamping ring around said end piece located to clamp the envelope to said end piece, said clamping ring overlying a channel provided in the end piece whereby to force the envelope into the channel, and a resilient peripheral fairing attached to the end piece to underlie part of the envelope, said envelope having a longitudinal seam, a first sealing strap disposed along said seam on the underside of said envelope, said first sealing strap disposed under said clamping ring and stopping short of said retaining ring, and a second sealing strap mounted along said seam on the outside of said envelope, said second sealing strap disposed over said clamping ring and continuing around and under said retaining ring.

2. A vessel according to claim 1, in which the strength-giving layer of the envelope is made from nylon.

3. A vessel according to claim 2, in which the turned-over portion is disposed under said clamping ring.

4. A vessel according to claim 1, in which the inner proofing layer stops short of the retaining ring.

5. A vessel according to claim 1, in which the outer proofing layer extends past the retaining ring.

6. A vessel according to claim 1, wherein one end of said envelope is attached to two said rigid end pieces, said two rigid end-pieces being disposed at two different locations of said envelope.

7. A vessel according to claim 6, wherein said end of the envelope is shaped to exhibit two corners, said end pieces being attached at said corners.

8. A vessel according to claim 1, wherein the channel is formed by a recess in the end piece.

9. A vessel according to claim 1, in which the shoulder is formed by a recessed emplacement for the ring provided in the end piece.

10. A vessel according to claim 1, wherein the end piece is provided with a resilient covering.

11. A vessel according to claim 1, wherein the end piece is a metallic tube.

12. A vessel according to claim 10, wherein the channel is formed by a gap left in the resilient covering.

13. A vessel according to claim 11, wherein the smallest internal diameter of the tube is of a size giving access to a person.

14. A vessel according to claim 11, wherein the channel is formed between beads pressed out from the material of the end piece.

References Cited in the file of this patent

UNITED STATES PATENTS

| | | |
|---|---|---|
| 235,237 | Hedrick | Dec. 7, 1880 |
| 453,719 | Leonard | June 9, 1891 |
| 529,478 | Bull | Nov. 20, 1894 |
| 744,846 | Williams | Nov. 24, 1903 |
| 1,232,827 | Milbauer | July 10, 1917 |

(Other references on following page)

UNITED STATES PATENTS

| | | |
|---|---|---|
| 1,233,993 | Douglas | July 17, 1917 |
| 2,263,346 | Arne | Nov. 18, 1941 |
| 2,492,699 | Houwink | Dec. 27, 1949 |
| 2,594,235 | Taylor | Apr. 22, 1952 |
| 2,854,048 | Cunningham | Sept. 30, 1958 |
| 2,915,097 | Lewis | Dec. 1, 1959 |
| 2,919,082 | Winzen et al. | Dec. 29, 1959 |
| 2,967,504 | Atanasoff et al. | Jan. 10, 1961 |
| 2,997,973 | Hawthorne et al. | Aug. 29, 1961 |

FOREIGN PATENTS

| | | |
|---|---|---|
| 323,235 | Great Britain | Dec. 27, 1929 |
| 1,159,028 | France | Feb. 3, 1958 |